(12) United States Patent
Roper et al.

(10) Patent No.: US 9,564,977 B2
(45) Date of Patent: Feb. 7, 2017

(54) PORTABLE THROUGH-THE-EARTH RADIO

(75) Inventors: Michael Roper, Ottawa (CA); Markus Svilans, Chelmsford (CA); Peter Kwasniok, Dunrobin (CA); Vladimir Puzakov, Stittsville (CA)

(73) Assignee: VITAL ALERT COMMUNICATION INC., Thornhill, Ontario (CA)

( * ) Notice: Subject to any disclaimer, the term of this patent is extended or adjusted under 35 U.S.C. 154(b) by 464 days.

(21) Appl. No.: 13/318,025

(22) PCT Filed: Nov. 16, 2010

(86) PCT No.: PCT/CA2010/001808
§ 371 (c)(1),
(2), (4) Date: Mar. 11, 2013

(87) PCT Pub. No.: WO2012/006711
PCT Pub. Date: Jan. 19, 2012

(65) Prior Publication Data
US 2013/0196593 A1 Aug. 1, 2013

Related U.S. Application Data

(60) Provisional application No. 61/365,092, filed on Jul. 16, 2010.

(51) Int. Cl.
*H04B 13/02* (2006.01)
*H04B 5/00* (2006.01)

(52) U.S. Cl.
CPC ............ *H04B 13/02* (2013.01); *H04B 5/0081* (2013.01)

(58) Field of Classification Search
CPC ........ H04B 13/02; H01Q 1/04; G06K 19/0723
(Continued)

(56) References Cited

U.S. PATENT DOCUMENTS 2,538,915 A * 1/1951 Rowland ................. H01Q 5/48
343/809
3,806,940 A * 4/1974 Grover ............... G01N 21/8983
307/157
(Continued)

FOREIGN PATENT DOCUMENTS

GB 2455653 6/2009
GB 2455654 6/2009
(Continued)

OTHER PUBLICATIONS

State Intellectual Property Office, Office Action dated Mar. 24, 2015, issued on Chinese Patent Application No. 201080068921.1 (english translation provided).
(Continued)

*Primary Examiner* — Hai V Nguyen
(74) *Attorney, Agent, or Firm* — Norton Rose Fulbright Canada LLP; Maya Medeiros

(57) ABSTRACT

The present invention provides an apparatus for portable through-the-earth radio (PTTER). The PTTER provides bidirectional voice and/or data communication between a surface radio and a portable radio. The PTTER also provides a transmit antenna having a primary loop and one or more secondary loops configured to increase the magnetic field produced by the primary loop. The PTTER also provides a transportable loop antenna that can be wound around a form for transportation. The PTTER also provides a receive antenna optimal for implementing noise cancellation. The PTTER also provides a navigation subsystem for detecting distance and direction to increase the effective range of the PTTER. The PTTER can be implemented in a backpack form factor.

20 Claims, 12 Drawing Sheets

(58) Field of Classification Search
USPC .............................. 455/40; 343/719; 375/218
See application file for complete search history.

(56) References Cited

U.S. PATENT DOCUMENTS

| | | | | |
|---|---|---|---|---|
| 3,893,109 | A * | 7/1975 | Chiron | G01S 13/56 342/28 |
| 4,207,568 | A * | 6/1980 | MacLeod | H04B 13/02 340/852 |
| 4,710,708 | A | 12/1987 | Rorden et al. | |
| 4,777,652 | A * | 10/1988 | Stolarczyk | H01Q 1/27 455/14 |
| 4,794,319 | A * | 12/1988 | Shimazaki | H01Q 1/1285 343/711 |
| 4,849,692 | A * | 7/1989 | Blood | F41G 3/225 324/207.16 |
| 5,093,929 | A | 3/1992 | Stolarczyk | |
| 5,198,826 | A * | 3/1993 | Ito | H01Q 7/00 343/713 |
| 5,229,780 | A * | 7/1993 | Hirotsu | H01Q 1/1271 343/713 |
| 5,955,884 | A * | 9/1999 | Payton | G01V 3/26 324/339 |
| 6,370,396 | B1 * | 4/2002 | Meiksin | H04B 1/38 455/557 |
| 7,043,195 | B2 * | 5/2006 | Bunton | H04B 5/02 455/11.1 |
| 7,043,204 | B2 | 5/2006 | Reagor et al. | |
| 7,050,831 | B2 * | 5/2006 | Meiksin | H04B 1/38 455/203 |
| 7,149,472 | B2 | 12/2006 | Reagor et al. | |
| 7,375,529 | B2 * | 5/2008 | Dupuis | G01R 33/028 324/244 |
| 7,583,648 | B2 * | 9/2009 | DaCosta | H04W 72/1263 370/338 |
| 7,705,599 | B2 * | 4/2010 | Strack | G01V 3/12 324/323 |
| 7,796,943 | B2 * | 9/2010 | Levan | H04B 13/02 324/344 |
| 7,812,609 | B2 * | 10/2010 | Martinez | G01V 3/28 324/339 |
| 7,898,260 | B2 * | 3/2011 | Pelegri | G01V 3/28 324/343 |
| 7,903,041 | B2 * | 3/2011 | LeVan | H01Q 7/00 343/700 MS |
| 8,008,919 | B2 * | 8/2011 | Wang | G01V 3/28 324/338 |
| 8,094,077 | B2 * | 1/2012 | Yanagi | H01Q 1/2266 343/700 MS |
| 8,299,936 | B2 * | 10/2012 | Papadopoulos | H01Q 1/04 324/118 |
| 8,428,511 | B1 * | 4/2013 | Gunasekara | H04B 13/02 340/12.32 |
| 8,477,068 | B2 * | 7/2013 | Melconian | G01S 3/44 342/359 |
| 8,670,708 | B2 * | 3/2014 | Burris | H04B 13/02 455/40 |
| 8,885,559 | B2 * | 11/2014 | Schmidt | G01D 21/00 340/539.13 |
| 8,886,117 | B1 * | 11/2014 | Hong | H04B 13/02 343/788 |
| 9,081,066 | B2 * | 7/2015 | Hetherington | G01R 33/34007 |
| 9,179,475 | B2 * | 11/2015 | Koleszar | H04L 45/32 |
| 2002/0098867 | A1 * | 7/2002 | Meiksin | H04B 1/38 455/560 |
| 2002/0129633 | A1 * | 9/2002 | Joki | F16C 19/52 72/13.4 |
| 2004/0266497 | A1 | 12/2004 | Reagor et al. | |
| 2006/0286931 | A1 * | 12/2006 | Rhodes | H04B 13/02 455/40 |
| 2008/0009242 | A1 | 1/2008 | Rhodes et al. | |
| 2008/0252295 | A1 * | 10/2008 | Pelegri | G01V 3/28 324/333 |
| 2009/0015262 | A1 * | 1/2009 | Strack | G01V 3/12 324/348 |
| 2009/0160449 | A1 * | 6/2009 | Martinez | G01V 3/28 324/343 |
| 2009/0245025 | A1 * | 10/2009 | Rhodes | H04B 13/02 367/134 |
| 2009/0322640 | A1 * | 12/2009 | LeVan | H01C 27/00 343/788 |
| 2010/0207399 | A1 * | 8/2010 | Grandics | H01O 1/248 290/1 R |
| 2010/0311325 | A1 * | 12/2010 | Marshall | H04B 13/02 455/40 |
| 2011/0057838 | A1 * | 3/2011 | Melconian | G01S 3/44 342/359 |
| 2012/0112966 | A1 * | 5/2012 | Tayama | H01Q 9/40 343/700 MS |
| 2012/0223706 | A1 * | 9/2012 | Hetherington | G01R 33/34007 324/307 |

FOREIGN PATENT DOCUMENTS

| | | |
|---|---|---|
| GB | 2455906 | 7/2009 |
| GB | 2455909 | 7/2009 |
| GB | 2455910 | 7/2009 |

OTHER PUBLICATIONS

IP Australia, Office Action dated Mar. 19, 2014, issued on Australian Patent Application No. 2010357580.
Patent Cooperation Treaty, Written Opinion and International Search Report dated May 30, 2011, issued on PCT Application No. PCT/CA2010/001808.
State Intellectual Property Office, Office Action dated May 4, 2014, issued on Chinese Patent Application No. 201080068921.1 (english translation provided).
State Intellectual Property Office, Office Action dated Dec. 7, 2015, issued on Chinese Patent Application No. 2010800689211 (english translation provided).
State Intellectual Property Office, Search Report dated Nov. 27, 2015, issued on Chinese Patent Application No. 201080068921.1.
"Antenna Book" 21st Edition (ARRL The National Association for Amateur Radio), ISBN 0-87259-987-6, Feb. 2007 (Feb. 2007) *chapter 5 pp. 13, 23.
IP Australia, Patent Examination Report No. 2 dated May 22, 2015, issued on Australian Patent Application No. 2010357580.

* cited by examiner

PORTABLE THROUGH-THE-EARTH RADIO

FIELD OF THE INVENTION

The present invention relates generally to a radio operable to transmit and receive a signal through the earth or other thick, solid barriers. The present invention relates more specifically to a portable radio operable to transmit and receive a signal through the earth or other thick, solid barriers.

BACKGROUND OF THE INVENTION

It is known that most current wireless communication technologies are unable to traverse a thick solid barrier made from materials such as rock, concrete or soil. At frequencies greater than a few kHz, the skin depth of these weakly conductive materials is quite small and electromagnetic waves are attenuated to the point where communication is not possible over even short distances (<1 m). In work environments such as tunnels and mines, workers are therefore not able to readily communicate, for example, with supervisors or other workers located at a different part of the tunnel or located above the surface of the earth.

Such communication systems are not only useful for regular day-to-day work; they are indispensable in times of emergency. For example, if a tunnel collapses with a worker inside, providing such communications could significantly reduce the time to find and rescue the trapped worker. This would provide a significant improvement in the chances of saving the life of the worker.

A number of solutions have been proposed to the problem of providing through-the-earth communication. The simplest is to provide a wired link between the worker and the person with which they are communicating. However, this clearly restricts the worker to either the length of the wire or requires the worker be in a specific location, the terminating end of the wire, to initiate communication. It is also expensive to lay sufficient wire, particularly for very long tunnels and mines. Furthermore, in times of emergency, particularly a mine collapse or similar event, or even just due to wear and tear, wires are prone to sever, rendering the medium unusable.

Therefore, some wireless solutions have also been proposed for through-the-earth communication.

U.S. Pat. No. 7,043,204 to David Reagor et al. teaches a method and apparatus for effective through-the-earth communication involving a signal input device connected to a transmitter operating at a predetermined frequency sufficiently low to effectively penetrate useful distances through-the-earth, and having an analog to digital converter receiving the signal input and passing the signal input to a data compression circuit that is connected to an encoding processor, the encoding processor output being provided to a digital to analog converter. An amplifier receives the analog output from the digital to analog converter for amplifying said analog output and outputting said analog output to an antenna. A receiver having an antenna receives the analog output and passes the analog signal to a band pass filter whose output is connected to an analog to digital converter that provides a digital signal to a decoding processor whose output is connected to a data decompressor, the data decompressor providing a decompressed digital signal to a digital to analog converter. An audio output device receives the analog output from the digital to analog converter for producing audible output.

U.S. Pat. No. 7,149,472 to David Reagor et al. teaches a through-the-earth communication system that includes a digital signal input device; a transmitter operating at a predetermined frequency sufficiently low to effectively penetrate useful distances through-the-earth; a data compression circuit that is connected to an encoding processor; an amplifier that receives encoded output from the encoding processor for amplifying the output and transmitting the data to an antenna; and a receiver with an antenna, a band pass filter, a decoding processor, and a data decompressor.

Both these patents provide a means of wireless through-the-earth communication. However, inherent in their designs is a requirement for relatively large and heavy equipment. In particular, the signal strength required to enable communications as taught by these patents requires a relatively large low frequency magnetic field to be generated by the transmitter. The magnetic field is generated by sending an alternating current around wire loop antenna, the size of the field being proportional to the magnitude of the current and the area of the wire loop. For a link of 500 ft, the current may be 10 A, and the loop area 50 square meters. The power supply for these devices is thus generally relatively large and heavy. Thus, at best a portable unit could be used as a receiver only. It is not generally possible for a worker to carry or easily move such a device if it were to have a transmitter. The size of the antenna further prevents adapting these patents for mobile use. It is also very difficult to transmit a voice signal at such low frequencies. For these reasons, neither of these two patents disclose a mobile implementation for a two way through-the-earth-radio.

U.S. Pat. No. 5,093,929 to Larry G. Stolarczyk et al. teaches a method for using an underground mine communication system to effect mine-wide communication and an intrinsically safe current limiter circuit for insuring that electrical equipment in the system will not cause incendiary conditions. The underground mine communication system comprises a plurality of repeaters and medium frequency radios, including mobile, portable and personal-carried radios, coupled to electrical conductors and natural waveguides existing in the earth, formed by coal seams, for example, by tuned loop antennas. Messages transmitted by the radios are carried to the repeaters by the conductors or natural waveguides. The repeaters amplify, replicate and retransmit the message at two different frequencies for transmission of the message to a surface base station and to other radios in the system. A paging system, which has a separate set of repeaters, is also coupled to the network of electrical conductors and natural waveguides by tuned loop antennas. The paging system alerts miners to contact the surface base station. Radios, pagers and repeaters in the system are equipped with the intrinsically safe current limiter circuit to preclude the development of incendiary conditions. The current limiter circuit comprises a series arrangement of a current trip circuit, a redundant current trip circuit and a current limiting field effect transistor controlled by a feedback control amplifier.

U.S. Pat. No. 4,777,652 to Larry G. Stolarczyk teaches a radio communications system operational within the medium frequency range (300 kHz to 3 MHz) for underground mine communications, coupling MF carrier signals into existing conductive channels extending to within the mine and devices within the mine and coupled to the conductive channel for receiving the MF carrier signals and communicating with portable and mobile transceivers operational within the MF frequency range and in the common seam mode. This patent requires a conductive channel, such as wire, for communicating a signal.

U.S. Pat. No. 7,050,831 to Zvi H. Meiksin et al. teaches a method and system for communication within an energy-transmission-limited environment. Multiple RF transceivers throughout the site are located site-wide such that areas within the site in which communications are desired are within range of at least one of the RF transceivers. At each location RF transceivers are connected to a control unit. The control unit provides power to the transceivers and allows bi-directional communication of audio/voice and/or digital information. The control units may be networked to each other using standard network type category-5 or equivalent cables and may communicate to one another via the network connection. The control units may also be networked via an alternating current power line by using an alternating current modem. The transceiver utilizes single sideband modulators to modulate voice and/or digital signals.

U.S. Pat. No. 4,710,708 to Louis H. Rorden et al. teaches a location method using relatively low frequency electromagnetic fields, e.g., 1-1000 Hz, for determining the relative position and/or orientation of a transmitting magnetic dipole antenna by using a vector field receiver. The transmitting antenna for subterranean location is preferably a single axis, elongated solenoid with a ferromagnetic core. The receiving sensor may be a precise three-axis magnetic field detector of either a magnetometer or search coil type. Measurements are made for one or more positions of either the transmitter or receiver, or with one or more transmitters or receivers. The relative location of the transmitter and the receiver is calculated with respect to some known survey station by a method of successive approximations. The operating frequency is chosen to minimize field distortion from common steel structures, such as pipe, casing or railroad tracks, and to minimize field scattering such as from conducting inhomogeneities in the earth. Either the transmitter or receiver can be operated within metal structures such as casing. The method can be used for location of underground boreholes or pipelines; location of trapped miners; as a means of blind surveying such as in underground mines; or as a means of navigation such as in relatively shallow horizontal or vertical drilling and tunneling or in raise bore mining.

While each of these patents describes a mobile wireless implementation of through-the-earth communication, they all require some form of repeater or other fixed infrastructure to be used for relaying messages between the portable radio and the surface radio. The repeaters are in fixed location in the underground environment representing a large investment in infrastructure which may not be practical in underground environments that are only accessed occasionally, such as pipe-lines and sewers. In the event of an emergency, however, any or all of the repeaters could be damaged or even destroyed. Similarly, if the repeaters go out of service, the portable units are useless. In case of a cave or in a tunnel, the high frequency wireless communications between the repeaters and portable units would not work, as they would have to travel through rock. Additionally, similar to the fixed applications, these repeaters would also require large and heavy power supplies and are therefore not adaptable to portability.

U.S. Patent Publication No. 20080009242 to Mark Rhodes et al. teaches a data communication system that includes a transmitter, receiver and magnetically coupled antenna. The transmitter transmits data in a digitally modulated electromagnetic or magnetic signal. A receiver is provided for receiving the digitally modulated electromagnetic or magnetic signal. At least one of the transmitter and receiver is below ground and has a magnetically coupled antenna. Rhodes proposes a low frequency communications system very similar to those taught by Reagor. Rhodes proposes the use of simple loop antennas for transmitting, such that there is no new solution to the problems of power consumption and antenna size.

Furthermore, a person skilled in the art will understand that the antennae proposed by Rhodes ignore several fundamental issues related to the design of compact antennas for TTE communications. For example, Rhodes proposes the use of a simple, un-tuned loop antenna with a diameter of 1 m and 100 turns, without disclosing how such an antenna (which has an inductance of 52 mH and an impedance at the cited frequency of 5 kHz of +j1600 ohms) can be driven by a transmitter. To drive a current of only 1 A into this antenna, which would provide a Dipole Moment of only 100 $Am^2$, would require a transmitter with an output voltage in excess of 1.5 kV. This is not practical for portable, or even fixed, equipment, as is used in an underground environment. Rhodes also teaches that antenna size may be reduced by using a coil in the form of a solenoid which encloses a higher permeability material such as ferrite. This does not address the problem of saturation of the core, which will occur at the levels of flux density needed to transmit over a useful distances, and is indeed the reason why this type of antenna has to date only been used as a receive antenna in TTE or other applications.

Other prior art is directed to low frequency antennas for underwater communications.

Great Britain Patent No. 2455909 to Mark Rhodes et al. teaches an antenna formed of multiple planar arrayed loops that is claimed to require a lower voltage power supply than an equivalent single loop on the basis that it has a lower inductance since currents in adjacent loops inside the antenna area cancel. However with this arrangement it is apparent that for a given Dipole Moment the power consumption of an antenna is increased in proportion to the number of arrays used to form the antenna. In a portable application, such as portable through-the-earth, it is essential to minimize the power consumption.

Great Britain Patent No. 2455653 to Mark Rhodes et al. teaches an antenna with multiple resonant loops, in which the loops are mutually coupled and tuned such that each resonates at a frequency close to the desired transmit frequency in order to increase the impedance bandwidth of the antenna. In this regard the antenna is very similar to a tuned band-pass filter in which the coupling between two resonators, closely spaced in frequency, is adjusted to obtain a given pass-band response. In a portable application, however, it is preferable to increase the Dipole Moment of the antenna and narrow the bandwidth of the primary antenna.

Great Britain Patent No. 2455654 to Mark Rhodes et al. teaches an electrically small antenna which is intended to synthesize a very low frequency plane wave by creating the E and H field components. However for a portable device used in above and below ground environments, the dielectric medium is air, and this requires the generation of a very high alternating voltage Which may create safety hazards in a unit that is worn on the body, as well as requiring a separate transmitter circuit.

Great Britain Patent No. 2455908 to Mark Rhodes et al. teaches a method whereby one or more ferrite receive antennas are placed in a direction orthogonal to the axis of a transmit loop antenna, in order to minimize the coupling between them, and thus to prevent the transmitter desensitizing the receiver. However it would be preferable to not require any particular orientation between the receive and transmit antennas.

Great Britain Patent No. 2455910 to Mark Rhodes et al. teaches a wearable antenna for low frequency underwater communications. It illustrates a number of antenna orientations in which the low frequency loop encircles a part of the user's body. The embodiments described have a number of practical disadvantages including restriction of the user's movements, stress imposed on the antenna windings by said movements, and the exposure of the user to the full strength of the magnetic field created by the loop antenna.

Thus, it is clear that there is a need to provide these workers with a means of reliably communicating through the earth and other physical barriers to wireless communication, while retaining their mobility, and without needing to rely on repeater equipment or other infrastructure. The primary challenge in providing such a technology is the minimization of the size and weight of the equipment, particularly for the transmitter and transmit antenna, to provide portability. Most importantly, both the power supply and the antenna structure for the transmitter must be small and light enough to be carried by a worker. To provide such features, a technique would have to be developed for enabling through-the-earth communication with significantly less transmission power than currently exists and a more efficient antenna design would be required. These have not been achieved to date.

Therefore, there is a need for a through-the-earth radio in which all aspects of the design are arranged such that the transmission power and antenna size are minimized to enable portability.

SUMMARY OF THE INVENTION

The present invention provides a through-the-earth radio apparatus characterized by a surface radio and a portable radio synchronized to selectively transmit a signal by means of a time division duplexed magnetic field.

The present invention also provides a through-the-earth portable radio characterized by: (a) a transmit antenna; (b) a receive antenna; and (c) radio circuitry linked to the transmit antenna and the receive antenna, the radio circuitry operable to: (i) generate a time division duplexed signal transmittable to a surface radio as a time division duplexed magnetic field by the transmit antenna; and (ii) decode the signal when the receive antenna receives a time division duplexed magnetic field from the surface radio.

The present invention further provides a transmit antenna for through-the-earth radio communication characterized by: (a) a primary loop antenna, the primary antenna configured to transmit a signal at an operating frequency; and (b) one or more secondary loop antennas looped coaxially with the primary loop antenna, the one or more secondary loop antennas tuned to a higher frequency than the operating frequency; wherein the one or more secondary loop antennas increase the magnetic field produced by the primary loop antenna.

The present invention additionally provides a transportable loop antenna for through-the-earth radio communication characterized by an antenna having one or more loops wound trapezoidally along a plane.

The present invention yet further provides a method for bidirectional transmission of a signal through the earth, the method characterized by selectively transmitting a signal by means of a time division duplexed magnetic field between a surface radio and a portable radio.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

The present invention provides an apparatus for portable through-the-earth radio (PTTER) comprising a surface radio and a portable radio. It should be understood that the present invention refers to "through-the-earth" communications but that this refers to other physical barriers to wireless communications such as thick walls, for example, and is also operable without any physical barrier.

The surface radio of the present invention may be deployed on the surface of the earth (directly on the earth or mounted to a vehicle, for example) or at a location underground and may be fixed, transportable or portable. The portable radio may be deployed underground, remote from the surface radio. It should also be understood that the portable radio of the present invention could also be adapted for fixed or transportable implementation. The PTTER differs from prior art applications in that the portable radio is operable to communicate wirelessly and directly with the surface radio without use of repeaters while being implementable in a size and weight enabling portability, such as to be carried or worn by a person. The surface radio may be substantially similar in construction to the portable radio and for that reason the following disclosure describes the construction and use of the portable radio only. Correspondingly, communications in one direction, such as from the portable radio to the surface radio, should be understood to apply to communication in the other direction.

The present invention provides a PTTER capable to communicate bidirectionally. The present invention also provides a PTTER having a transmit antenna capable of greater through-the-earth range than prior art antennas. The present invention further provides a receive antenna operable with a noise cancellation subsystem to further enhance greater through-the-earth communication. The present invention additionally provides a transportable loop antenna, capable of extending transmission range, which can be implemented in a flexible form factor capable of being rolled into a cylinder. The present invention further still provides a navigation subsystem for increasing its effective operating range. The present invention yet further provides a PTTER that can be implemented in a backpack form factor.

Figure 1:
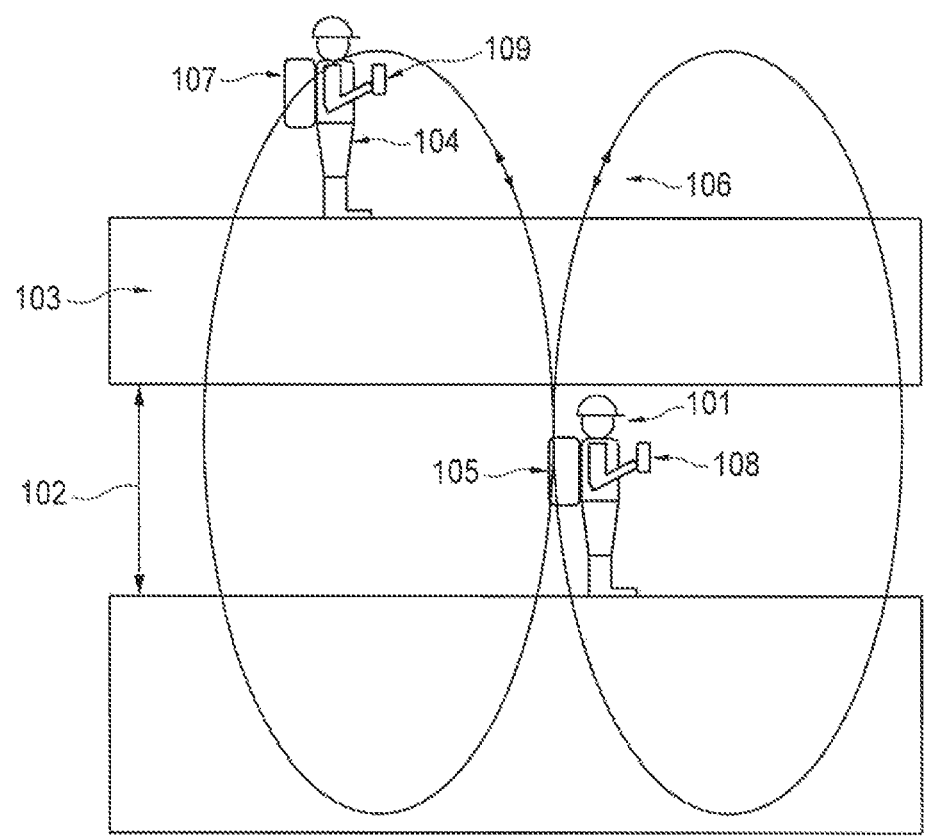
FIG. 1 illustrates an example use of a PTTER in accordance with the present invention.

FIG. 1 illustrates an example use of a PTTER in accordance with the present invention. A first user (101) may be below ground inside a tunnel or other space (102), separated from the surface by a layer of rock, soil, concrete or other mildly conductive material (103). The first user may communicate with a second user (104) located at the surface via a portable radio (105) that can radiate a magneto-inductive signal, such as a low frequency magnetic field (106), detectable by a surface radio (107). Each user may be provided with a user interface (108),(109) that allows them to send and receive data or voice messages.

The PTTER may provide bidirectional communications of the magneto-inductive signal. Bidirectional communication may be provided by implementing time division duplexing to alternate the direction of transmission and allow communications to take place in both directions. Alternatively, bidirectional communication may be provided by implementing frequency division duplexing to provide separate channels for each direction of transmission. Time division duplexing may be advantageous compared to frequency division duplexing since, for particular mediums such as through-the-earth, the spacing of frequencies possible for implementing frequency division duplexing is narrow and, therefore, less than optimal.

Bidirectional communications provided by the PTTER of the present invention is beneficial firstly because it enables two-way data and/or voice communication, but also because it enables a convenient means to monitor connectivity between a surface radio and a portable radio and, therefore, presence of the other radio.

The PTTER may enable bidirectional voice and/or data communications by synchronizing the surface radio and the portable radio to selectively transmit a signal by means of a time division duplexed magnetic field as a carrier signal. Particular methods of implementing synchronization have an additional benefit of enabling each radio to determine whether the other radio is within communication range.

A portable radio (and a surface radio) in accordance with the present invention may comprise a transmit antenna having a primary loop and a secondary loop coupled to and aligned coaxially with the primary loop. The primary loop may be timed to a particular frequency (the operating frequency of the PTTER, for example) while the secondary loop may be tuned to a higher frequency (for example, approximately twice the frequency for which the primary loop is tuned) so as to increase the overall magnetic field produced by the transmit antenna. The primary and secondary loops may also have multiple turns to increase the transmit antenna's Dipole Moment and range. The increase in overall magnetic field is greatly advantageous in increasing the range of a through-the-earth radio.

A portable radio (and a surface radio) in accordance with the present invention may also comprise a receive antenna configured to optimize noise reduction or noise cancellation, thus optimizing signal reception. The receive antenna may be a three-axis orthogonal antenna array that, due to its orthogonal orientation, enables effective and efficient noise cancellation. A noise cancellation subsystem may be provided for processing a received signal to reduce or cancel noise.

Both transmit and receive antenna designs may also provide minimized size and power consumption to further promote portability. Power consumption reduction is highly desirable since battery size and weight directly affects portability. A lower weight PTTER promotes higher portability.

A transportable loop antenna may also be provided for extending the transmission range of the PTTER. The transportable loop antenna may be a loop antenna arranged in the form of one or more wire loops wound in a trapezoidal shape and bonded to a flexible material, and which can be wound around a cylindrical form for transportation. The wire loops could alternatively be wound in a spiral shape. The transportable loop antenna provides a convenient portable means for extending the range of the PTTER.

A portable radio (and a surface radio) in accordance with the present invention may also comprise a navigation subsystem which can determine the position of the portable radio from a known starting point and transmit this information to the surface radio, allowing users of the portable radio and the surface radio to track each other's movements, so as to enable them to remain within communication range while traveling a long distance.

The present invention yet further provides a PTTER that can be implemented in a backpack form factor. The backpack may be configured to include some or all of the above features while being lightweight and of a size convenient for wearing by a person.

To implement bidirectionality, a time division duplexed signal in accordance with the present invention may comprise a frame structure that enables constant synchronization and link availability between the surface radio and portable radio. The time division duplexed magnetic field also enables minimization of power consumption of the transmitter of the surface radio and portable radio by allowing the transmitter current to be reduced until the receive signal quality (at the other radio) falls below a preconfigured threshold.

A low duty cycle communication signal may also be provided for minimizing power consumption and, therefore, further promoting portability. The portable radio (and a surface radio) may also be operable to reduce power consumption by providing one or more preconfigured and indexed voice and/or text messages that can be transmitted by sending a short code word from the portable radio to the surface radio.

Figure 2:
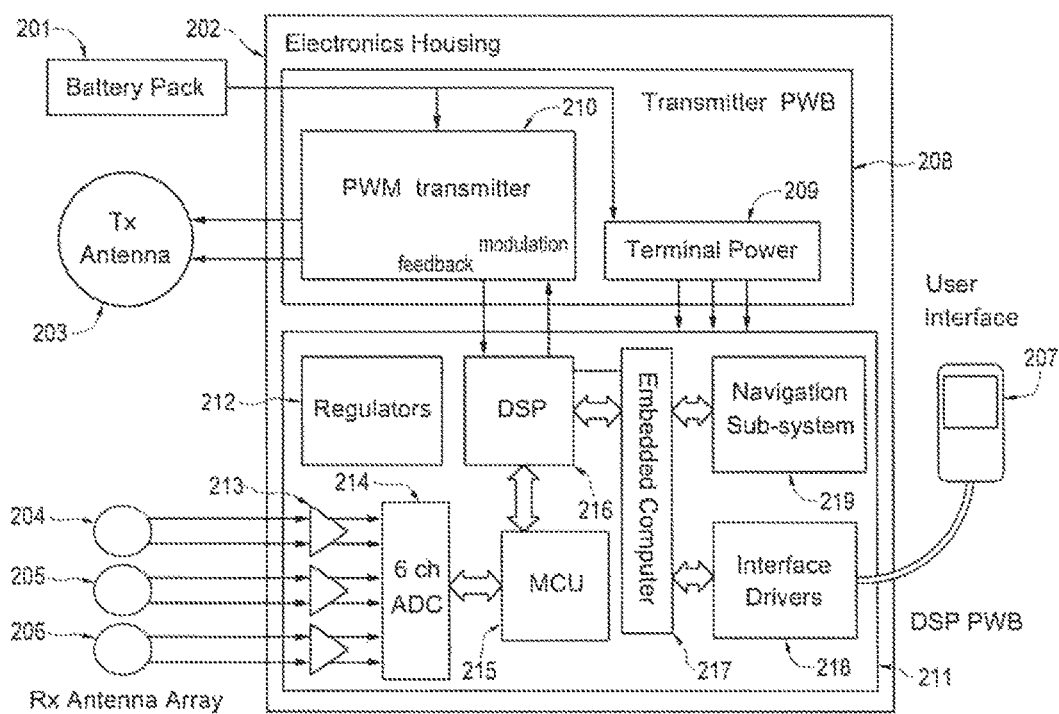
FIG. 2 illustrates an example of an electronic circuit providing a portable radio in accordance with the present invention.

The portable radio may comprise antennas, a radio circuit (including transceiver electronics) and a power supply. The portable radio is operable to communicate with the surface radio, for example being embodied as a fixed, transportable or portable transceiver, located for example elsewhere in the underground environment or above the surface of the earth. FIG. 2 illustrates an example of an electronic circuit providing a portable radio in accordance with the present invention. The electronic circuit may comprise a housing (202) having an electrical connection to an internal or external battery pack (201), a transmit antenna (203), a receive antenna array (204), (205), (206) and a user interface (207). The power supply may be a mains power supply, particularly for implementing a surface radio, however the surface radio could also be powered by a battery pack.

Figure 12:
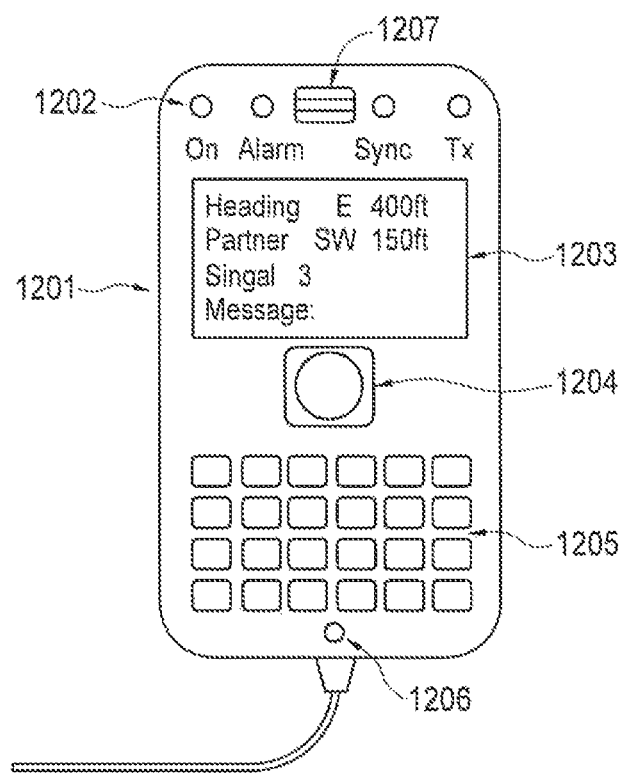
FIG. 12 illustrates a user interface in accordance with the present invention.

FIG. 12 illustrates a user interface in accordance with the present invention. The user interface (1201) may be provided by a built-in display, electronically connected display monitor, or wired or wireless link to a PDA, smartphone, mobile phone, tablet, or other device having a display. The user interface may also include one or more LEDs (1202) for indicating key conditions such as power level, alarm status, synchronization status and transmitter activity. Detailed visual information may be provided on a display (1203) and may be operable to display information from a navigation subsystem and data messages to a user. An input device (1204) such as a touch-pad, scroll wheel or ball may be provided to select commands on the user interface, including preconfigured and indexed text or voice messages. A physical or virtual keypad (1205) may be provided for direct entry of text and data. A microphone (1206) and speaker (1207) may be provided to support voice communications.

Optimally, the radio circuitry is provided on two separate printed wiring boards (PWB) or printed circuit boards (PCB), a transmitter PWB (208) and a DSP PWB (211), in order to separate high current transmit components from noise-sensitive analog and digital hardware. The transmitter PWB may comprise an efficient pulse width modulated (PWM) amplifier capable of driving a low impedance antenna with a transmit current. In one example, a transmit current of approximately 30 A peak may be provided. The battery pack (201) may be electrically connected to a terminal power circuit (209) that converts the battery voltage to the levels required by the rest of the electronic circuit.

Regulators (212) may be provided on the DSP PWB (211) to smooth the power supplied to the electronic circuit. The DSP PWB may also comprise the receiver and control circuits for the portable radio. One or more receive antennas (204), (205), (206) that comprise a receive antenna array may provide two output signals, the main receive signal and a sample signal (for example a 60 Hz sample signal), which may be obtained from the receive antenna array or a secondary antenna loop. These output signals may be separately filtered and amplified by the receive amplifiers (213). The corresponding output signals may be sampled by an analog to digital converter (ADC) (214). The ADC may comprise at least two inputs for each receive antenna array (at least a 6 channel ADC for 3 receive antennas, for example), one for the main receive signal and one for the sample signal.

The ADC output may be read by a fast microcontroller unit (MCU) (215) and then forwarded to a DSP (216). The DSP may be provided with instructions enabling it to execute an algorithm that may include modulation and demodulation, synchronization. TDD framing and voice encoding. The 60 Hz sample waveforms may also be used by the DSP to obtain an accurate estimate of the frequency of power line noise which may also occur in the VLF communication band. This estimate may be used to filter out harmonics of the 60 Hz noise using comb filtering or averaging methods, or a combination of both methods. The DSP (216) may generate the modulated transmit signal which may be sent to the PWM transmitter (210). A feedback signal may be used to correct distortion in the signal current created when using a high Q antenna. The received data may be formatted by an embedded computer (217), in accordance with interface drivers (218) compatible with the particular user interface provided, and sent to the user interface (207) for viewing by the user. Transmission of data may occur in an opposite flow of reception of data. A navigation subsystem (219) may also be provided for enabling the portable radio and surface radio to communicate over an effective range far greater than the transmission range, as will be discussed further below.

A transmitted signal may be communicated at low frequency using a loop antenna. Due to the low frequencies involved, communication may take place in the near field of the antenna, where the radiation is quasi-stationary. The magnetic field strength along the axis of a loop antenna is given by the following formula:

$$Br = \frac{\mu A \cdot N \cdot I}{2\pi r^3} \cos(2\pi w t)$$

where $H_r$ is in A.m and
A=loop area
N=number of loops (turns)
I=current, with angular frequency $w=k\sqrt{(\mu \in)}$
r=distance from the coil center The field strength is proportional to the area of the loop, the number of turns and the magnitude of the alternating current. The antenna Dipole Moment is a convenient measure of its ability to generate a magnetic field and is given by:

Dipole Moment=A.N.I

Typical antennas used to date for communications at VLF frequencies through the earth have typically operated below 10 kHz in order to obtain useful communications (>100 m) in weakly conductive strata. Operation at such a low frequency is achieved with a large antenna area, typically around 4 m×6 m, with few turns (to keep the loop inductance small) and a large circulating current in the order of 10 A. The Dipole Moment of such an antenna with 4 turns is in the order of 1000 $Am^2$ which is sufficient to provide a range greater than 500 feet through most types of strata, with moderate levels of background noise.

Figure 3:
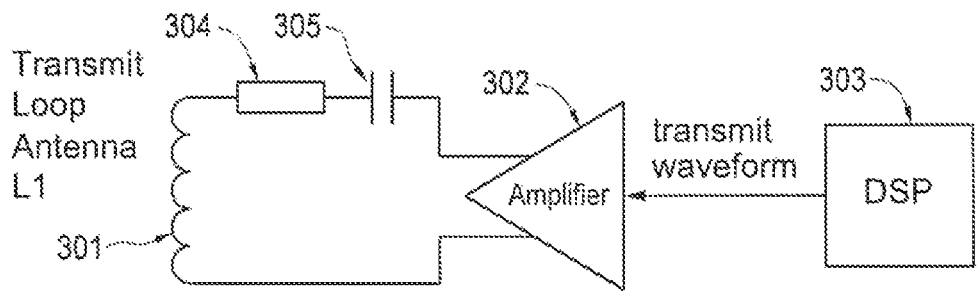
FIG. 3 illustrates a conventional VLF transmitter

However, in a useful portable application, antenna area A is constrained to a size which can be conveniently carried below ground, which would typically have to be less than 1 $m^2$. Using multiple turns in the antenna loop increases its inductance in proportion to $N^2$, which presents a high impedance to the transmitter and, for a given power supply voltage, limits the current that can be driven into it. FIG. 3 illustrates a conventional VLF transmitter with a multi-turn antenna (301), driven by an amplifier (302) which converts the transmit waveform, generated by a Digital Signal Processor (303), into a high voltage output. The inductance of the antenna is tuned to series resonance by a capacitor (305), thus presenting low impedance to the transmitter output and increasing the output current and magnetic field strength. The Q of the tuned circuit, which is a function of the antenna inductances and the circuit resistance (304) determines the bandwidth of the antenna. To prevent distortion of the transmitted signal, the antenna bandwidth cannot be made less than the signal bandwidth, which may be 1 kHz in order to transmit 1 kb/sec using QPSK modulation in a full duplex TDD channel. The signal bandwidth may thus ultimately determine the inductance and number of turns in the transmit antenna.

Contrary to the antennas proposed by Rhodes et al., in a portable application it is preferable to minimize the power consumption and so in the present invention the conductor(s) may be placed around the periphery of the antenna in either a solenoid or spiral configuration. Furthermore, in the present invention, the secondary loop(s) may be instead tuned to a frequency far above that of the primary loop in order to appear as a higher impedance capacitive element, such that the current flowing in the secondary loop serves to increase the Dipole Moment of the antenna. The strengthened magnetic field has the effect of slightly narrowing the bandwidth of the primary antenna, the opposite effect to the coupled antenna taught by Rhodes.

In addition, to prevent the requirement of a very high alternating voltage, the present invention provide magnetic induction as the basis of communication, where a single transmitter can be used to drive a loop antenna to create the desired alternating magnetic field component.

As previously mentioned, the transmit antenna of the present invention may comprise a primary antenna and one or more secondary loop antennas. This provides an increased magnetic held with minimal additional input current (i.e. lower power). The primary loop antenna may be formed of multiple turns and resonated at the operating frequency of the transmitter by a series capacitor. This minimizes the antenna impedance, maximizing the circulating current and Dipole Moment and therefore, the magnetic field, of the antenna. The one or more secondary loop antennas may be resonant at a higher frequency than the primary antenna, and may also be coupled to the magnetic field of the primary antenna. The transmit antenna, in practice, can be implemented in less than one square meter.

In operation, the magnetic field from the primary antenna induces an electromagnetic field in the one or more secondary antennas which, by virtue of having a predominantly capacitive impedance at the resonant frequency of the primary antenna, creates a current in the secondary antennas that reinforces the magnetic field and increases the Dipole Moment of the antenna without requiring a proportional increase in current from the transmitter.

Figure 4A:
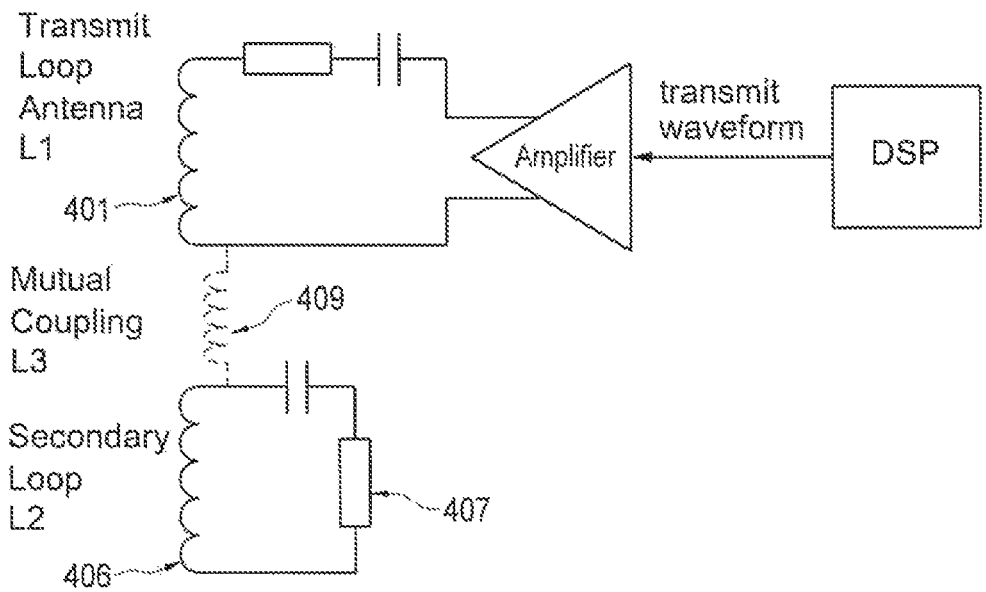
FIG. 4 illustrates a transmit antenna in accordance with the present invention.

FIG. 4a illustrates a transmit antenna in accordance with the present invention. The transmit antenna may comprise a main loop antenna (401), as described above, and one or more secondary loop antennas (406) which may be aligned on the same axis as the main antenna, and therefore magnetically coupled to the main antenna, providing a mutual coupling inductance (409). The secondary loop may be tuned to a higher series resonant frequency than the main loop antenna, and with the loss resistance (407) being small. At the operating frequency, the impedance of the secondary loop may be predominantly capacitive, so the voltage induced in it by the main loop drives the current in a direction which reinforces the magnetic field. If the secondary loop was not tuned, or was tuned to a resonant frequency below that of the main loop, the current excited in it would act to cancel the magnetic field from the main antenna. Table 1 illustrates examples of the effect of adding a secondary tuned loop to a 10 turn tuned loop antenna with an inductance of 160 uH on magnetic flux density measured at a remote location. When closely coupled, the secondary loop increases the output of the antenna by 35%.

TABLE 1

| Mutual coupling (uH) | Main loop resonant frequency (Hz) | Total Current (A rms) | Magnetic Flux Density (nT) |
|---|---|---|---|
| 100 | 3.52 | 16.7 | 71.8 |
| 80 | 3.62 | 16.1 | 69.2 |
| 60 | 3.81 | 15.9 | 67.2 |
| 40 | 3.90 | 15.3 | 65.8 |
| 20 | 3.96 | 13.7 | 58.9 |
| 0 (no secondary) | 3.96 | 12.5 | 52.5 |

It is also possible to add another secondary loop on the opposite side of the main antenna to form a high output antenna with a form factor suitable for mounting in a backpack, as will be discussed further below.

Figure 4B:
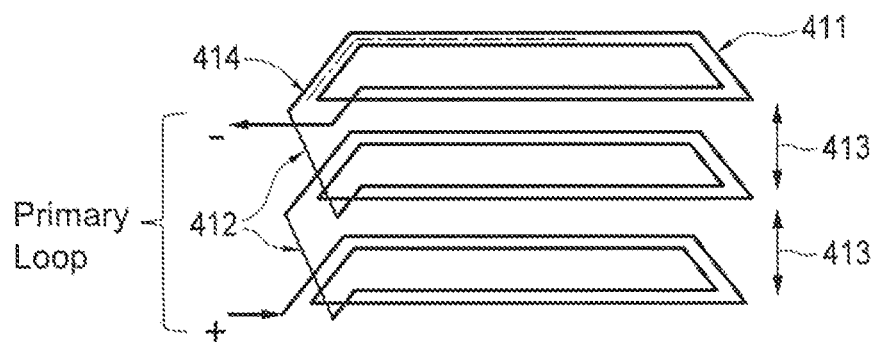

The antenna described above may conventionally be implemented by winding the primary and secondary loops as solenoids along the same axis. The turns in each loop may be spaced apart to minimize the inductance between them. FIG. 4b shows an alternative embodiment of the antenna, in which groups of turns (411) are wound in a spiral instead of as a solenoid. A plurality of such spiral antennas may be connected in series by additional wires or conductors (412) to form a single primary loop. The spirals are confined to the outer edge of the antenna volume in order to maximize their area, and hence the antenna Dipole Moment. Multiple spirals may be placed one above another to increase the Dipole Moment of the antenna. The layers may be placed with a wide spacing (413) in order to minimize the overall inductance. In this alternative antenna configuration, the same number of turns and inductance can be provided in a much shorter antenna than if the turns are wound as a solenoid with the turns spaced apart. An antenna suitable for a portable through the earth radio may employ 5 turns in each of 4 spirals with an outer turn 0.2×0.3 m and with the spacing between the spirals of 5 cm, resulting in an overall length of 0.2 m. The secondary loop may be added to this configuration by winding it between the turns of the primary antenna in each spiral as illustrated in the diagram by the segment of a loop (414). This configuration of the secondary loop may provide the correct degree of coupling required to increase the magnetic field as in the previously described embodiment.

Figure 5:
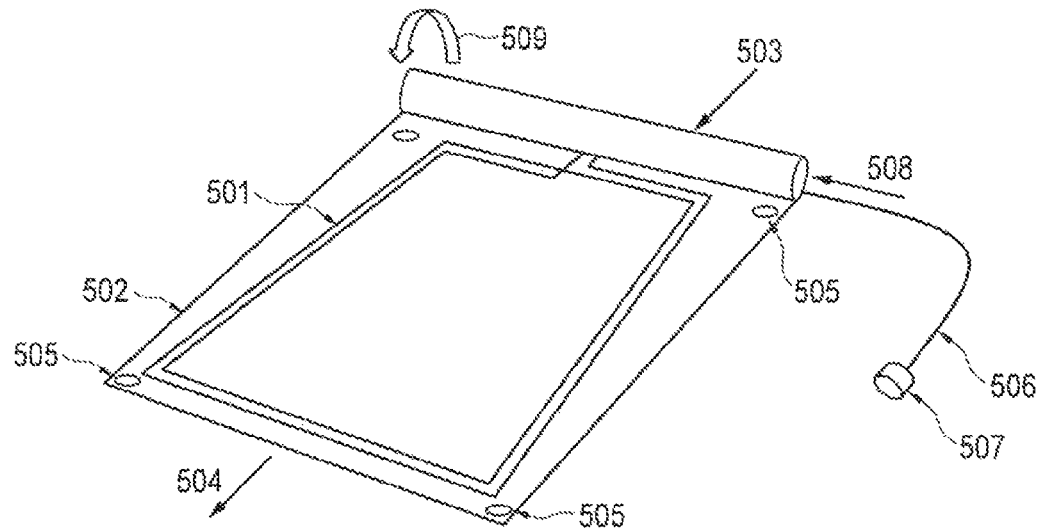
FIG. 5 illustrates a transportable loop antenna operable with the PTTER.

The transmission range of the transmit antenna may be extended through the use of a transportable loop antenna which can be carried by the user and set up at a location to provide a temporary communications link through a solid obstruction. FIG. 5 illustrates a transportable loop antenna operable with the PTTER. The transportable loop antenna may comprise one or more loop antennas (501) that are bonded to a tough flexible sheet of material (502) to form a trapezoidal shape, and wound onto a cylinder (503). The sheet may be a material such as Dacron™ or Kevlar™ reinforced Mylar™, and the antenna wires may be bonded in position by adhesives, threaded through sleeves bonded to the sheet or sandwiched between two bonded layers of material. For simplicity only one 2-turn antenna is shown in the illustration, although more turns and/or more antennas may be used. When deployed the sheet is unrolled (504) and can be held into a flat shape, maximizing the area of the antenna loops, by passing pegs or other fastenings through the grommets (505), located in each the corner of the sheet. Separate loops may be attached to the sheet for the transmit and receive directions, with the transmit antenna preferably incorporating a secondary loop placed inside the main loop and tuned to a higher frequency to increase the strength of the magnetic field as described earlier. The tuning capacitors and other associated electrical components may be conveniently housed inside the tube. The antennas may be connected to the portable radio via a cable (506) and plug (507) to the connector receptacle located on a housing for the radio circuitry.

For transportation, the sheet may be wound (509) around the tube (508) to form a tightly wound cylinder. The trapezoidal shape of the antenna windings may be arranged such that the wires do not overlap, and thus the sheet can be wound around the tube in a compact manner. For example, if the tube diameter is 8 cm, each turn will accommodate approximately 0.25 m of the sheet, which may be approximately 1 mm thick. A sheet 5 m×2 m could then be carried as a cylinder 2 m long and with a diameter of 12 cm. A sheet this size could contain a trapezoidal transmit antenna with 4 turns and an area of 8 m² as well as a secondary loop. Driven with a current of 30 A, the transmit antenna would have a Dipole Moment of approximately 1500 Am², or 15 times that of the regular transmit antenna described previously, and is thus capable of more than doubling the range of communications. Optionally, a receive antenna and 60 Hz sampling loop may also be incorporated into the sheet.

Figure 6:
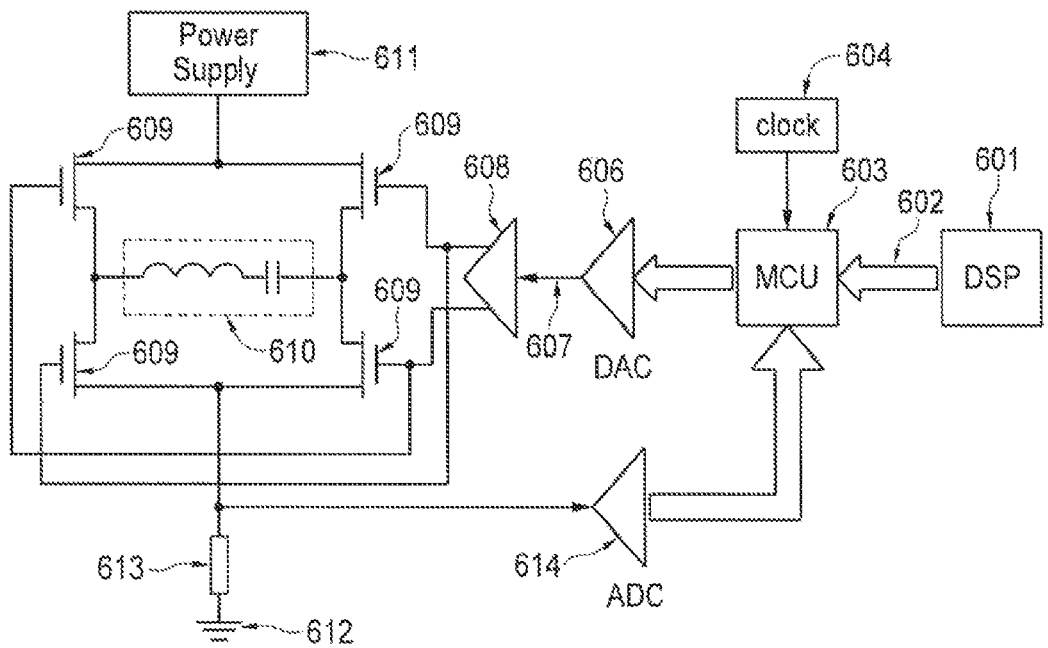
FIG. 6 illustrates transmission of a signal by pulse width modulation in accordance with the present invention.

The signal transmitted from the transmit antenna(s) of the portable radio (or surface radio) to the receive antenna(s) of the surface radio (or portable radio, respectively) may be a phase and/or amplitude modulated sine wave with a fundamental frequency equal to the desired operating (transmit) frequency of the PTTER. An operating frequency in the range 1 to 30 kHz may be optimal for through-the-earth communications. FIG. 6 illustrates transmission of a signal by pulse width modulation in accordance with the present invention. For the sake of clarity, components including filters, protection devices, etc., which are contemplated in the present invention, have been omitted from the diagram, as the advantages provided by these components would be clear to a person skilled in the art. The signal, modulated to convey the desired information (voice and/or data), may be generated by a DSP (601) as a sampled parallel data stream (602) with a sampling frequency greater than (and preferably much greater than) the operating frequency. The signal may be pulse-width modulated, for example by a MCU (603) provided with instructions enabling it to execute a pulse-width modulation algorithm on the signal. The modulation frequency may be derived from a reference clock (604) that is preferably at least 10 times the maximum operating frequency. This pulse-width modulated signal may then be converted to an analog voltage (607) by a digital to analog converter (DAC) (606). The pulse-width modulated signal may be output to a driver amplifier (608) for voltage amplification.

Four field effect transistors (FETs) (609) may be arranged in a full bridge circuit around the transmit antenna (610) providing a path to power supply+'ve (611) and ground (612) via a resistor (613). The FETs can connect either end of the antenna to the power supply+'ve (611) or ground (612) via resistor (613), thus generating an alternating current in the antenna. The driver amplifier (608) may be used to generate the gate control voltages necessary to drive the FETs (609) on and off corresponding to the pulse-width modulated signal. As is well known in the art, by varying the duty cycle of the PWM signal, the voltage at the output of the FETs may be controlled without dissipating much power in the FETs, creating an efficient power amplifier. The antenna may be tuned to the operating frequency and as described above may preferably include one or more secondary loops (not shown) to increase the magnetic field.

Figure 7A:
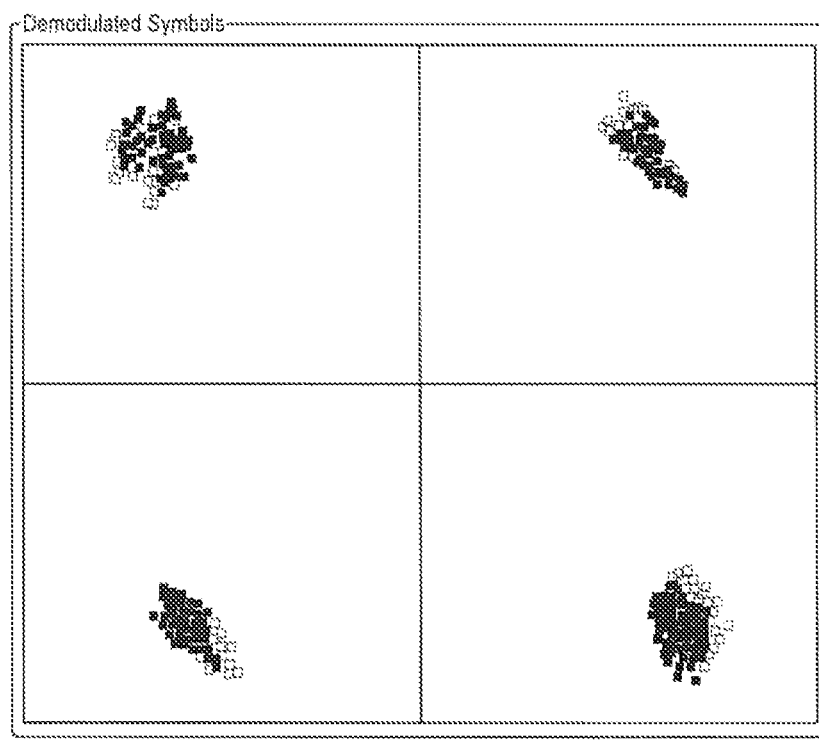
FIG. 7 illustrates distortion in the transmitted signal constellation
Figure 7B:
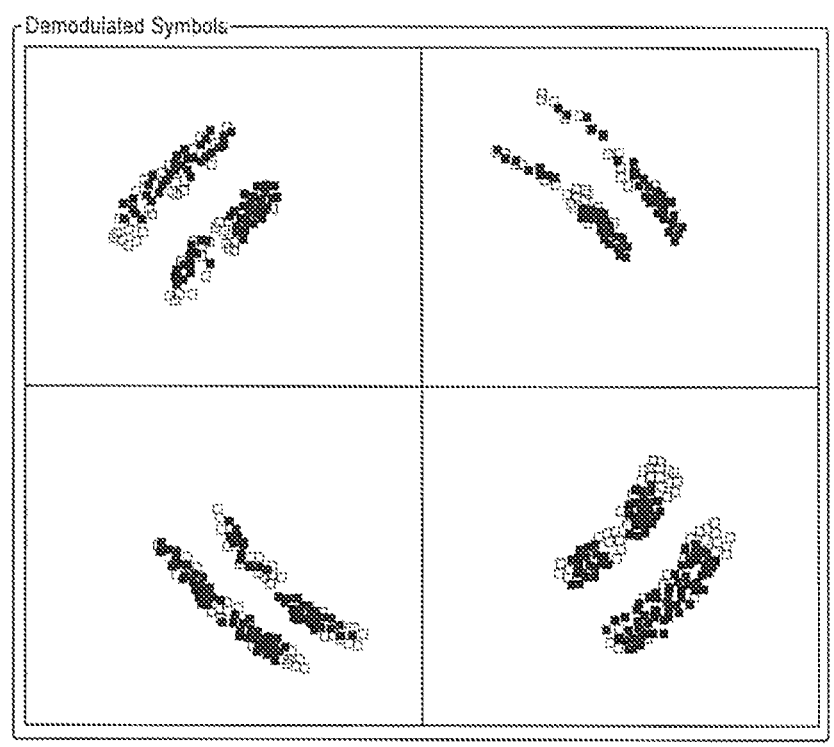
Figure 7C:
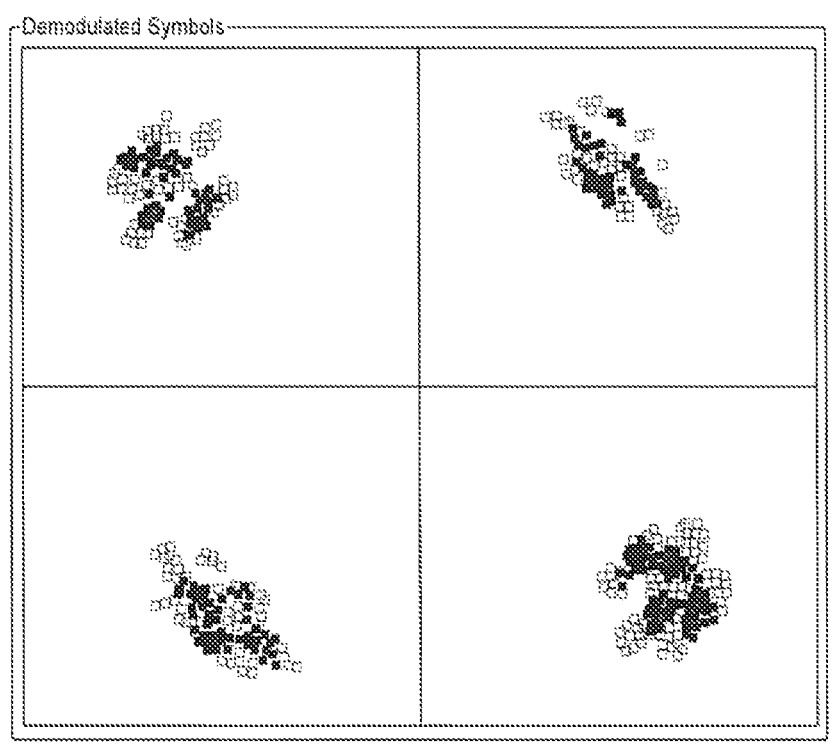

The instantaneous current in the antenna, and hence the transmit magnetic field, may be proportional to the width and polarity of the PWM pulses driving the FETs. However, if the antenna bandwidth is less than the signal bandwidth, the antenna impedance may change as a function of the instantaneous frequency of the signal, resulting in a different current than desired and therefore distorting the transmitted signal (i.e the transmitted magnetic field). FIG. 7a illustrates distortion in the transmitted signal constellation using an antenna with a low Q and antenna −3 dB bandwidth much greater than the signal bandwidth. FIG. 7b illustrates distortion in the transmitted signal constellation using an antenna with a high Q and antenna −3 dB bandwidth less than the signal bandwidth. The latter constellation shows a significantly greater error in the location of the QPSK symbols, due to the inter-symbol interference (ISI) created by the antenna. This will reduce the operational signal to noise ratio and thus the range of the system. It may therefore be desirable to utilize the stronger magnetic field of a high Q antenna without generating distortion. In the present invention this may be done by sampling the current flowing through the VLF antenna, for example by means of a low value resistor (613) or a transformer. The measured current may be digitized by an ADC (614) and then fed back to the MCU (603), where the magnitude of the current at each sample in the antenna may be compared with the target value and any error compensated by adjusting the next PWM pulse. Provided the update rate of the PWM system is fast enough (for example, at least 10× the maximum transmitter frequency) a real-time closed loop feedback system can be created to ensure the current in a high Q antenna follows the desired modulated signal waveform with low distortion. FIG. 7c illustrates distortion in the transmitted signal constellation using an antenna with a high Q in accordance with the present invention.

Figure 13:
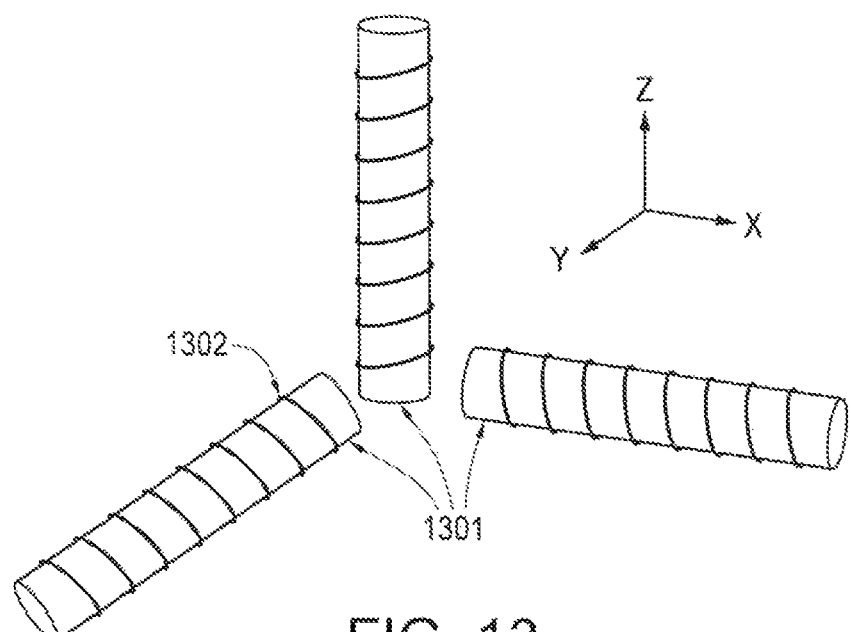
FIG. 13 illustrates a receive antenna array in accordance with the present invention.

A receive antenna in accordance with the present invention may be optimally constructed to receive the transmitted signal. In one example, the receive antenna may be a three-axis array antenna to sample the received magnetic field. The three-axis antenna may comprise three small loop antennas, ferrite loaded loop antennas or ferrite rods, each wound with multiple turns of wire to form a compact antenna, arranged on orthogonal axes as illustrated in FIG. 13. The ferrite material may concentrate the received magnetic flux inside its turns. Each antenna may be coupled to a receiver that filters and amplifies the signals in the frequency band of the PTTR (i.e. 2 to 10 kHz). Noise cancellation may be applied to the receive antenna. For example, the three received signals may be sampled and processed in order to maximize the signal to noise ratio of the received signal, for example by optimally weighting and combining the three signals.

The present invention provides bidirectional communication between the portable radio and surface radio. This can be accomplished by providing time division duplexing (TDD) for the communication signal, in which during each TDD frame the portable radio is configured to transmit at a half frame and receive at an alternative half frame, and the surface radio is configured to transmit and receive at the opposite half-frames of the portable radio.

Time division duplexing may be used to separate the transmitter and receiver functions in time, as is further described below. When the transmitter is operating the receiver is disabled by means of a switch which disconnects it from the antenna and short circuits the receiver input. Guard times may be used to allow the transmitter current to settle to a low value before the receiver is connected to its antenna. In this way the receive antenna(s) may be placed on 3 orthogonal axes and with any desired orientation with respect to the transmit antenna, and a much higher transmit/receive isolation may be obtained than the method described by Rhodes et al.

Figure 8:
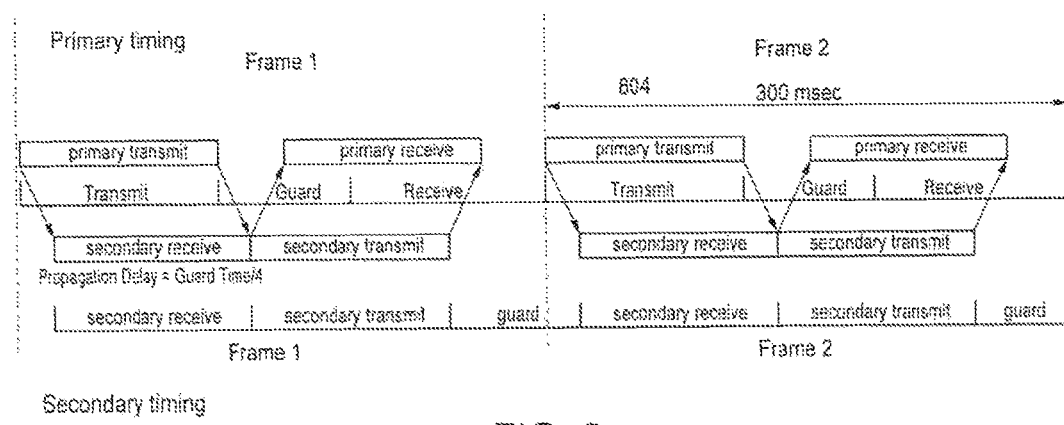
FIG. 8 illustrates an example of a TDD frame in accordance with the present invention.

FIG. 8 illustrates an example of a TDD frame in accordance with the present invention. The TDD frame may be divided into three sections comprising transmit, receive and guard time. The guard time can be used to enable the portable radio and surface radio to synchronize their respective transmit and receive half-frames, despite any propagation delay between the radios. In a VLF system in accordance with the present invention, the propagation delay (accounting for filters and the communication medium) may be several milliseconds, so the corresponding frame duration (804) may, in this example, be configured to approximately 300 ms to ensure a reasonable efficiency.

One of the portable radio or surface radio may be designated as the primary radio and the other may be designated as the secondary radio. The primary radio may provide a master time reference. Two types of frames may be transmitted between the units: sync frames and data frames. Sync frames may include a unique multi-symbol synchronization word enabling the receiving radio to establish for example symbol timing, frame timing and set its local clock to the same timing as the transmitter. Data frames may transport data packets or digitally encoded voice samples. System information may be encapsulated in special control data packets which may also apply a cyclic redundancy code (CRC) to detect errors. The control data packets may also contain a number of special data fields, including a dead reckoning position output of the embedded computer (which is discussed below) and power control commands (also discussed below).

Figure 9:
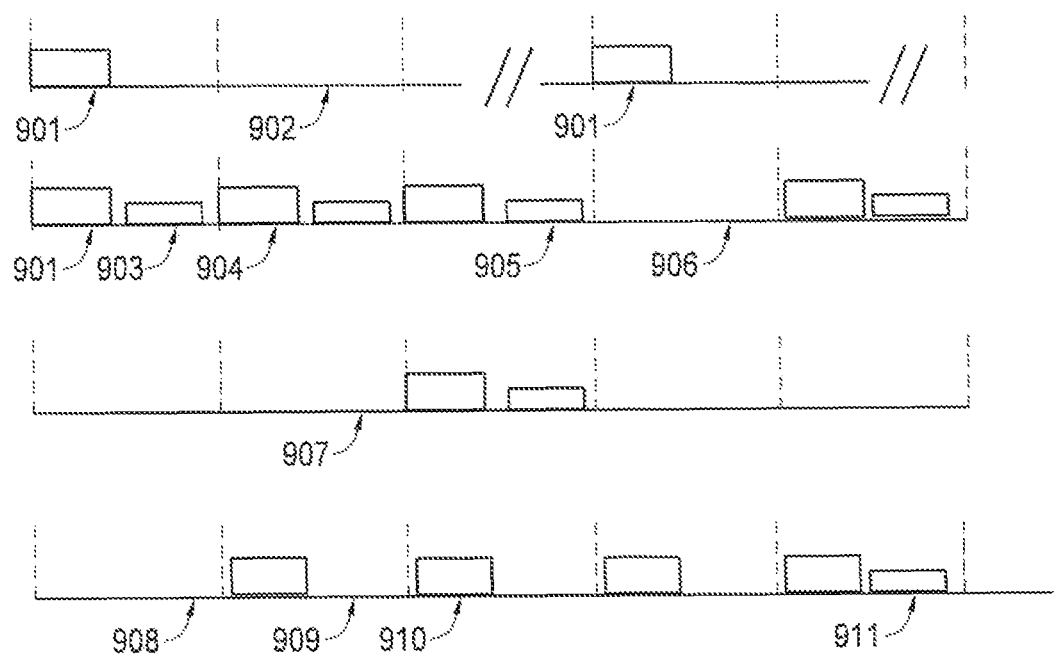
FIG. 9 illustrates the use of TDD to reduce power consumption in accordance with the present invention.

Particular implementations using time division duplexing may also enable a reduction of power consumption of the portable radio. FIG. 9 illustrates the use of TDD to reduce power consumption in accordance with the present invention. On initialization, the primary radio may transmit control half-frames (901) at a low duty cycle, and null frames (902), in which the transmitter is muted, in between the control frame. Thus the primary radio's power consumption is reduced if the secondary radio is not within range or is turned off. The duty cycle may, for example, be once every 10 seconds. At this duty cycle, the average power drawn from the power supply by the transmitter may be reduced by a factor of approximately 33 to around 7 W even if it is transmitting at full current. The duty cycle may be reduced further, for example to less than 5% for further power consumption reduction.

As soon as a secondary radio is able to synchronize to the primary radio transmission it may respond by transmitting a control half-frame back to the primary radio (903). The primary radio may then start to transmit consecutive frames (904) until synchronization is achieved and verified by each radio (905), which can be verified by the primary radio confirming that the frequency error of the secondary radio is within tolerance. The response from the secondary radio need not be in the same frame, but each response may be delayed by a predetermined number of frames if required. Once synchronization is verified, each radio may measure the quality of its received signal, and may determine whether the other radio should reduce (or increase) its transmit power. After receiving a half-frame from the secondary radio confirming synchronization (905), the primary radio may start transmitting normal data frames and may insert a single null frame (906) into the transmission, in which its transmitter is muted and draws minimal or no current. Each receiver may be kept active during all half-frames. This process may be continued (907), (908) so that the time between data frame transmissions is gradually increased while, by means of the feedback provided in the control data packets, the transmit current at each end of the link may be gradually minimized, reducing the likelihood of a loss of synchronization. The insertion of null frames may continue until the duty cycle is reduced to a low value, such as one transmission every 10 seconds, for example. The transmitter power consumption will be even lower than at initialization if the transmitter is running at a reduced output power.

If at any time in this process the primary radio does not receive a data frame back from the secondary radio (909), the primary radio may restart transmitting consecutive sync frames (910), incrementing its output power with each frame to minimize the time during which synchronization is lost. Once the primary radio receives a half frame back from the secondary radio (911), the power control process can start again with the primary radio sending consecutive transmissions until the secondary radio has reestablished the link, or a time-out interval occurs, and the primary goes back to the initialization state.

If at any time voice and/or data needs to be transmitted, additional data frames may be sent in the null frames. If data is sent 5% of the time the system is in use, the average transmitter power consumption may increase, in this example to approximately 18 W. In this example, if the receiver consumes 5 W of power the total consumption of each radio is approximately 23 W, or approximately 1 A from a 24V battery. Under these conditions, the radios can operate for 8 hours using a battery with 8 Ahr capacity, providing a form factor and weight enabling portability.

A further means of reducing the time used for data transmission is to program each radio with one or more preconfigured and indexed voice and/or text messages that are indexed by a short code. The user interface for the radio can be used, for example, by scrolling through a list of the messages and selecting the message that is desired to be transmitted. In this case, a short indexed code can be sent inside a control data packet instead of the full message. Upon reception at the receiver, the code index can be checked and the intended message can be displayed to the user.

The PTTER as herein described in specific examples may provide bidirectional voice and/or data communication between the surface radio and the portable radio at a distance of approximately 100 m (herein referred to as a "fixed range"). It should be understood that different distances could be provided by configuring the transmission frequency, power supply and/or antennae appropriately. A navigation subsystem may be provided for enabling the portable radio and surface radio to communicate over an effective range far greater than the fixed transmission range.

Referring to FIG. 2, the embedded computer (217) used for receiving data can also be used to determine the relative position of the portable radio and surface radio based on distance and direction data obtained by the navigation subsystem (219). The navigation subsystem may include or be linked to a means for detecting distance and direction. For example, the navigation subsystem may include a pedometer and electronic flux gate compass. Alternatively, a movement vector could be computed from the outputs of a compass and a 3-axis MEMS accelerometer or small gyroscope.

The navigation subsystem may provide the embedded computer with periodic updates on the distance and the direction the portable radio has moved since its last update. The embedded computer can use this information to periodically update a dead reckoning position from a reference point known to both units, such as a tunnel entrance point or air shaft. This information can be transmitted to the surface radio in a control data packet where it may be compared with the surface radio's own distance and direction computation to estimate the distance and direction between the two radios. Similarly, the surface radio can transmit its distance and direction to the portable radio, enabling the portable radio to estimate the distance and direction between the two radios. Further information may be provided in the form of the signal level received from the other radio.

The user interface of each radio can be configured to display the distance and direction to enable the user of each radio to track the movements of the other user and adapt movement to ensure that the two radios remain within communications range.

Figure 10:
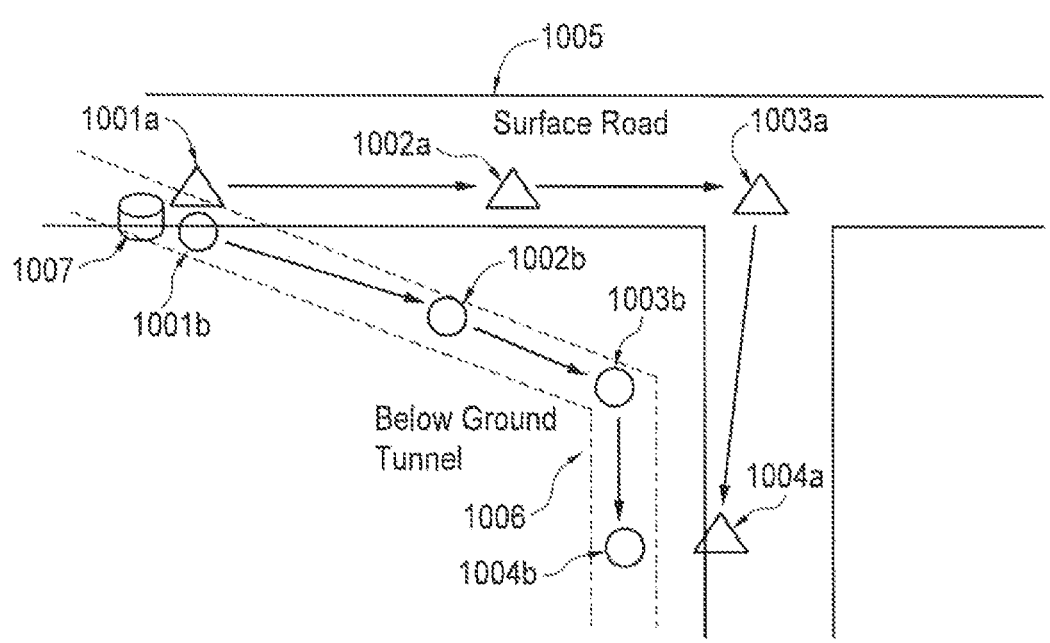
FIG. 10 illustrates an example of the use of the navigation subsystem.

FIG. 10 illustrates an example of the use of the navigation subsystem. An underground tunnel (1006) runs below a road network (1005). The starting location of each radio is the manhole entrance to the tunnel (1007). When both radios are at the manhole entrance (the portable radio in the underground tunnel and the surface radio on the road) the dead reckoning position on each radio can be reset to the origin (1001a),(1001b). The portable radio user can move along the tunnel, and the surface radio user can move along a convenient road in the same general direction. At subsequent locations (1002a),(1002b) and (1003a),(1003b), the portable radio and surface radio may exchange their estimated positions and optionally received signal level, and each can estimate the distance and direction to the other radio. The estimated distance and direction of the other radio, along with received signal level and current heading of the receiving radio, can be displayed on the user interface of the radio. For example at locations 1001a, 1002a, 1003a and 1004a the user interface of the surface radio may display the information shown in Table 2.

TABLE 2

|  | Location | | | |
|---|---|---|---|---|
|  | 1001a | 1002a | 1003a | 1004a |
| Current Heading | N | E | E | S |
| Partner Direction | 0 | SW | SW | W |
| Partner Distance | 0 | 50 ft | 150 ft | 40 ft |
| Signal Level (1 to 10) | 8 | 6 | 3 | 7 |

In this example, at position 1003a the user interface indicates that the paths of the two radios are diverging as compared to position 1002a as the distance between the units has increased and the received signal level has dropped. The surface radio user can correct this by heading in the direction of the portable radio, for example by moving along roadway S to location 1004a.

The portable radio of the PTTER of the present invention may also be adapted as a backpack for wearing by a user. It should be understood that the backpack could be adapted to another housing capable of being carried, wheeled, or other moved by an individual, such as a cart, for example. In one implementation of a PTTER adapted as a backpack, for example, the radio circuitry and power supply of the portable radio may be provided within the backpack while the antennae of the portable radio may be disposed thereon or extended therefrom.

Figure 11:
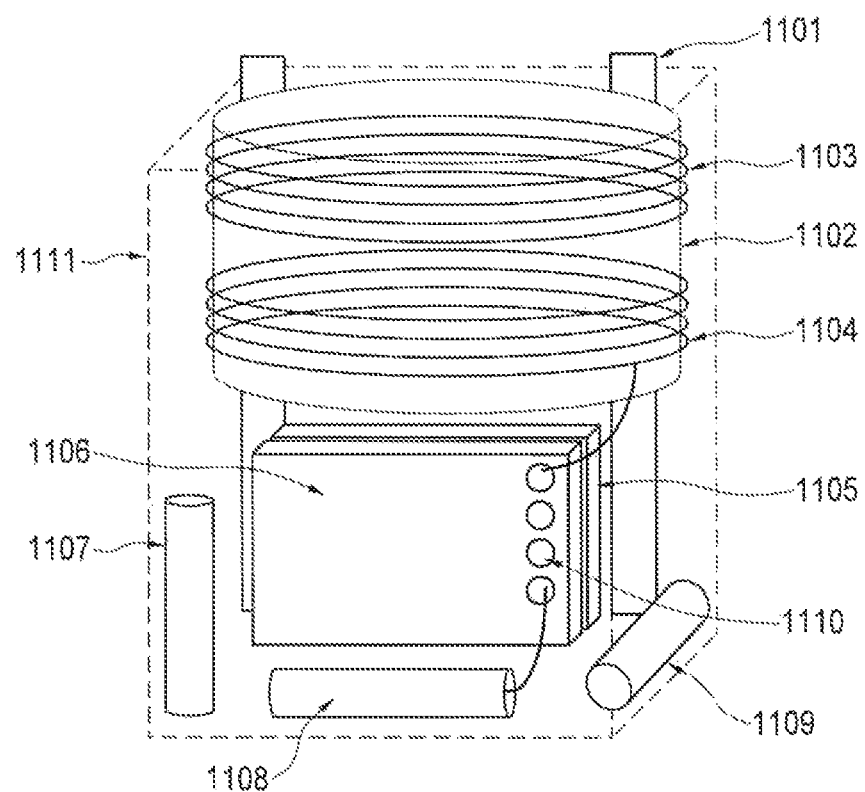
FIG. 11 illustrates an example of a backpack in accordance with the present invention.

FIG. 11 illustrates an example of a backpack in accordance with the present invention. The backpack may comprise a frame (1101) to support the electrical components of the portable radio. The backpack may also include one or more straps to enable a user to wear the backpack on the user's back and shoulders. The transmit antenna (1102) may comprise at least two wire coils (1103),(1104) which are magnetically coupled to form a compact but powerful transmit antenna. The antenna may be oriented with a loop axis vertical so the far field is constant regardless of the direction the user is facing. This arrangement enables the portable radio to communicate over a significant range, despite the small form factor of the antenna. Another secondary loop can be added on the opposite side of the main antenna to form a high output antenna with a form factor suitable for mounting in a backpack.

This implementation of the PTTER differs from that provided by Rhodes et al. by placing the transmit antenna in a protected housing (the backpack), worn on the user's back, such that the primary axis of the magnetic field is parallel to the users body, allowing the user freedom to move and reducing the user's exposure to the transmitted magnetic field.

The portable radio may be powered by a lightweight battery (1105) which may be located below the transmit antenna. The radio circuitry required to implement the transmitter and receiver (1106) may be housed in a shielded enclosure. The portable radio may include three different receive antennas (1107), (1108), (1109) oriented orthogonally on the X, Y and Z axis of the backpack. These antennas may also be small loop antennas or ferrite loaded loop antennas, as shown. The transmit and receive antennas may be connected to the radio circuitry by their respective connectors (1110). The antenna signals may be processed and combined in the receiver to ensure that the receive signal strength remains constant, independent of the orientation of the backpack. The radio circuitry enclosure (1106) may also include an inertial navigation subsystem for tracking the motion of the portable radio. The portable radio may be protected by an overall cover (1111) that may be constructed from a lightweight, weatherproof, non-metallic material, for example an epoxy-glass laminate. In a fixed, transportable or semi-permanent installation a separate deployable antenna may be connected to the backpack via connectors (1110) to extend the range of operation.

The portable radio may include three different receive antennas (1107), (1108), (1109) oriented orthogonally on the X, Y and Z axis of the backpack. These antennas may also be small loop antennas of ferrite loaded loop antennas, as illustrated in FIG. 13, where each ferrite rod (1301) may be wound with multiple turns of wire (1302) to form a compact antenna, the ferrite material acting to concentrate the received magnetic flux inside the turns of said antenna.

The techniques described above increase the antenna peak Dipole Moment enabling use of an antenna with small proportions suitable for mounting in the backpack. For example, an antenna with an area of $0.1\ m^2$, 20 turns and two secondary loops will provide a Dipole Moment of 90 $Am^2$ when the primary loop is driven with a current of 30 A peak, which is sufficient to provide a useful communication range for voice and data through many types of strata. If the total circuit losses are approximately 0.5 ohms, then the power absorbed by the antenna and transmitter when sending consecutive data frames will be approximately 225 W.

In operation, a portable radio user of surface radio user may initiate communication, for example by activating the radio's microphone. The person speaks into the microphone and the audio information may be formatted and pulse width modulated by the radio as previously described. The processor may queue the formatted and modulated audio for transmission and may transmit the formatted audio from the transmission antenna during periods that the time division duplexed carrier signal is set to output from the particular radio. The outputted signal may propagate through the earth until it reaches the receiving antenna of the other radio. The received signal may be processed by the receiving radio, for example removing distortion, and is demodulated. The audio information may then be output to a speaker coupled to the radio. A similar process may be used for transmission of data.

What is claimed is:

1. A transmit antenna for through-the-earth radio communication comprising:
   a tuned primary loop antenna, the primary antenna configured to transmit a magnetic field signal at an operating frequency; and
   one or more secondary loop antennas looped coaxially with the primary loop antenna, wherein the one or more secondary loop antennas are tuned to a higher frequency than the primary loop antenna;
wherein the one or more secondary loop antennas increase the magnetic field produced by the primary loop antenna; and
wherein the one or more secondary loop antennas are magnetically coupled to the primary loop antenna providing a mutual coupling inductance.

2. The transmit antenna of claim 1, wherein the higher frequency is approximately twice the operating frequency.

3. The transmit antenna of claim 1, wherein the primary loop antenna is formed of multiple turns and resonated at the operating frequency.

4. The transmit antenna of claim 1, wherein the primary loop comprises a plurality of spirals connected in series.

5. The transmit antenna of claim 1, wherein the operating frequency is in the range of 1 to 30 kHz.

6. The transmit antenna of claim 1, wherein the transmit antenna is mounted in or on a backpack.

7. A through-the-earth portable radio comprising:
   the transmit antenna of claim 1,
   a receive antenna; and
   radio circuitry linked to the transmit antenna and the receive antenna, the radio circuitry operable to:
      generate a time division duplexed signal transmittable to a surface radio as a time division duplexed magnetic field by the transmit antenna; and
      decode the signal when the receive antenna receives a time division duplexed magnetic field from the surface radio.

8. The through-the-earth portable radio of claim 7, wherein the time division duplexed signal is generated by a pulse width modulated amplifier.

9. The through-the-earth portable radio of claim 7, wherein the radio circuitry includes a current controlled feedback loop to prevent distortion in the transmitted time division duplexed signal.

10. The through-the-earth portable radio of claim 7, wherein the receive antenna is a three-axis array antenna.

11. The through-the-earth portable radio of claim 10, wherein the three-axis array antenna comprises three loop antennas, ferrite loaded loop antennas and/or ferrite rods, each wound with multiple turns and aligned orthogonally to the other two antennas.

12. The through-the-earth portable radio of claim 10, wherein noise cancellation is applied to the signal received by the three-axis array antenna.

13. A portable through-the-earth radio comprising:
   a housing;
   radio circuitry disposed within the housing;
   the transmit antenna of claim 1 disposed in or extending from the housing and electrically connected to the radio circuitry;
   a battery pack disposed within the housing and electrically connected to the radio circuitry;
   a receive antenna disposed within the housing and electrically connected to the radio circuitry.

14. The portable through-the-earth radio of claim 13, wherein the housing comprises a frame for supporting the radio circuitry, the transmit antenna, the battery pack and the receive antenna.

15. The portable through-the-earth radio of claim 13, wherein the housing comprises one or more straps to provide a backpack wearable by a user.

16. The portable through-the-earth radio of claim 13, wherein the transmit antenna is a loop antenna disposed so that its loop axis is vertical.

17. The portable through-the-earth radio of claim 13, wherein the radio circuitry is disposed within a shielded enclosure.

18. The portable through-the-earth radio of claim 13, wherein the receive antenna comprises a three-axis orthogonal antenna.

19. The transmit antenna of claim 1, characterized in that the primary loop antenna and the one or more secondary loop antennas are aligned on the same axis and spaced apart to be physically separate.

20. The transmit antenna of claim 1, characterized in that the primary loop antenna is formed by multiple turns and is tuned to series resonance at an operating frequency of a transmitter by a series capacitor.

* * * * *